United States Patent [19]

Hulterstrum

[11] Patent Number: 4,821,676

[45] Date of Patent: Apr. 18, 1989

[54] CART ASSEMBLY FOR A PARTIALLY-IMMOBILIZED ANIMAL

[76] Inventor: Harold D. Hulterstrum, 1155 College Ave., Baraboo, Wis. 53913

[21] Appl. No.: 152,658

[22] Filed: Feb. 5, 1988

[51] Int. Cl.[4] .................... A01K 29/00

[52] U.S. Cl. .................... 119/1; 119/96; 280/657; 280/63; 280/87.021

[58] Field of Search .................... 119/1, 96, 101, 102; 280/32.5, 47.13 R, 657, 63, 87.02 R, 87.01

[56] References Cited

U.S. PATENT DOCUMENTS

| | | | |
|---|---|---|---|
| 2,448,427 | 8/1948 | Gordon | 280/32.5 |
| 2,546,726 | 3/1951 | Creamer, Jr. | 119/1 |
| 2,976,840 | 9/1958 | Hugus | 119/1 |
| 3,215,117 | 11/1965 | Short | 119/1 |
| 3,241,851 | 3/1966 | Dingbaum | 280/34 |
| 3,406,661 | 10/1968 | Parkes | 119/1 |
| 3,580,222 | 5/1971 | Dunn | 119/102 |
| 3,663,038 | 5/1972 | Hendricks | 280/218 |
| 4,375,203 | 3/1983 | Parkes | 119/1 |

FOREIGN PATENT DOCUMENTS

| | | | |
|---|---|---|---|
| 1384533 | 2/1975 | United Kingdom | 280/47.13 R |

OTHER PUBLICATIONS

K-9 Carts Offer (K-9 Happiness).

*Primary Examiner*—Charles A. Marmor
*Assistant Examiner*—Michael Mar
*Attorney, Agent, or Firm*—Allegretti & Witcoff, Ltd.

[57] ABSTRACT

A cart assembly for a partially-immobilized animal. It includes a plastic cradle, having wheels, adapted to support and partially encompass the hind portion of the animal. A harness, secured over the head of the animal, is fastened to the plastic cradle.

3 Claims, 1 Drawing Sheet

CART ASSEMBLY FOR A PARTIALLY-IMMOBILIZED ANIMAL

BACKGROUND OF THE INVENTION

The present invention relates generally to an animal cart and more particularly to a cart assembly for a partially-immobilized animal, such as a cat or dog.

Many dogs and cats lose the use of their hind legs through injury, illness, age or obesity. Unable to walk, romp about, or exercise, the animal often becomes lethargic giving rise to additional health and care problems. This is a terrible experience for the pet owner.

Numerous animal slings, supports and carts are available but generally have proven unsatisfactory. This is particularly true where use of the hind quarters is completely lost, e.g. where the hind portion and legs are totally paralyzed.

SUMMARY OF THE INVENTION

In a principal aspect, the present invention is a cart assembly for a partially-immobilized animal, i.e. an animal having lost partially or full use of its hind legs. The cart assembly includes a plastic cradle and a harness. The cradle is adapted to receive and support the hind portion and immobilized hind legs of the animal. A pair of skirt portions and a pair of harness arms extend from the animal-supporting portion of the plastic cradle. The skirt portions extend downwardly and a pair of wheels are rotatably secured thereto.

The harness arms extend forwardly from the animal-supporting portion of the plastic cradle. The harness arms are designed to extend along the front body portion of the animal terminating in the shoulder region.

The harness is adapted to fit over the head of the animal. The harness extends towards the hind quarters along the front body portion of the animal, terminating the shoulder region. Fasteners secure the harness to the harness arms of the plastic cradle.

It is thus an object of the present invention to provide a cart assembly for a partially-immobilized animal. Another object is a cart assembly for a partially-immobilized animal wherein the hind portion and legs are fully supported, i.e., not suspended in any way.

It is also an object of the present invention to provide a cart assembly adapted to readily receive the partially-immobilized animal, thereby facilitating the process by which the animal is placed upon and secured in the cart assembly. Still another object is a cart assembly for a partially-immobilized animal which substantially avoids entanglement with ground clutter, such as tall grass, thickets and small bushes.

A further object is a cart assembly which is readily manufactured, maintained and cleaned. It is yet another object of the present invention to provide a lightweight, easily assembled and inexpensive cart assembly for a partially-immobilized animal.

These and other features, objects and advantages of the present invention are described or apparent in the following detailed description.

BRIEF DESCRIPTION OF THE DRAWING

A preferred embodiment of the present invention is described, in detail, with reference to the drawing wherein.

DETAILED DESCRIPTION OF A PREFERRED EMBODIMENT

Figure 1:
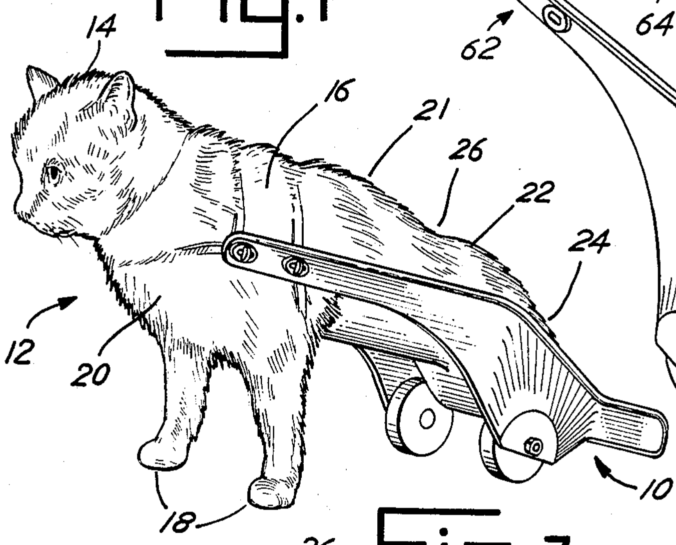
FIG. 1 is a first perspective view of a cat and a preferred embodiment of the cart assembly secured to a cat.

A preferred embodiment of the present invention is shown in FIGS. 1–5 as a cart assembly 10 for a partially-immobilized animal 12. As used herein, the terms "partially-immobilized", "immobilized", or obvious modifications thereof mean partial or complete loss of hind leg usage, e.g., a cat having paralyzed hind quarters. As best shown in FIG. 1, the animal 12 includes a head 14, shoulder region 16, front legs 18, front body portion 20, middle body portion 21, hip region 22, immobilized hind legs 24, hind body portion 26 and tail (not shown).

The cart assembly 10 includes four principal components: a plastic cradle 28, a harness 30, a pair of wheels 32, 34, and fastner means, generally designated 36, for securing the plastic cradle 28 to the harness 30. The plastic cradle 28 is preferably injection-molded and has smooth surface and rounded edges for animal comfort. It is molded in various sizes to accommodate animals ranging from a small kitten to a large dog.

The plastic cradle 28 is adapted to receive, hold and support the immobilized hind legs 24 and hind body portion 26 of the animal 12. As best shown in FIG. 1, the plastic cradle 28 provides full support in that the hind legs 24 are not suspended in any way from the cart assembly 10. This facilitates usage and shortens the adjustment period for the animal 12 since the animal 12 lies comfortably and naturally upon the plastic cradle 28.

The plastic cradle 28 includes an animal-supporting portion 38, a pair of skirt portions 40, 42, and a pair of harness arms 44, 46. The animal-supporting portion 38 is adapted to support and partially encompass the middle and hind body portions 21, 26 of the animal 12 such that the animal 12 will not slide off the plastic cradle 28 during use.

In this preferred embodiment, the animal-supporting portion 38 of the plastic cradle 26 includes a curved mid-support section 48 and a channeled hind-support section 50. As best shown in FIG. 1, the curved mid-support section 48 partially embraces the middle body portion 21 of the animal 12. The channeled hind-support section 50 holds the hind legs 24, hind body portion 26 and tail.

A first part 52 of the channeled hind-support section 50 extends at an angle in the range of forty to fifty degrees from the curved mid-support section 48, while a second part 54 thereof is substantially parallel thereto. The curved mid-support section 48 and channeled hind-support section 50 thereby define an offset "A" of preferably two inches, shown in FIG. 4, such that the plastic cradle 28 comfortably accommodates the animal 12. A channeled hind-support section 50 also has a central dividing wall 56 adapted to separate the hind legs 24 for further comfort and to balance the weight of the animal 12 upon the plastic cradle 28.

The skirt portions 40, 42 extend downwardly and outwardly from the animal-supporting portion 38 on opposite sides thereof. The skirt portions 40, 42 define wheel wells 58, 60, respectively.

The harness arms 44, 46 extend fowardly from the animal-supporting portion 38. More particularly, the arms 44, 46, extend from opposite sides of the curved mid-body support section 48 away from the channeled hind-support section 50.

Figure 2:
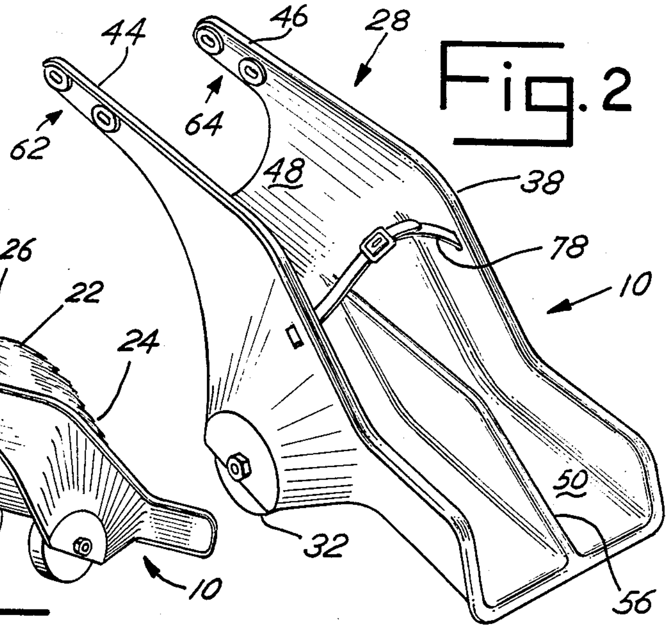
FIG. 2 is a perspective view of the plastic cradle of FIG. 1.
Figure 3:
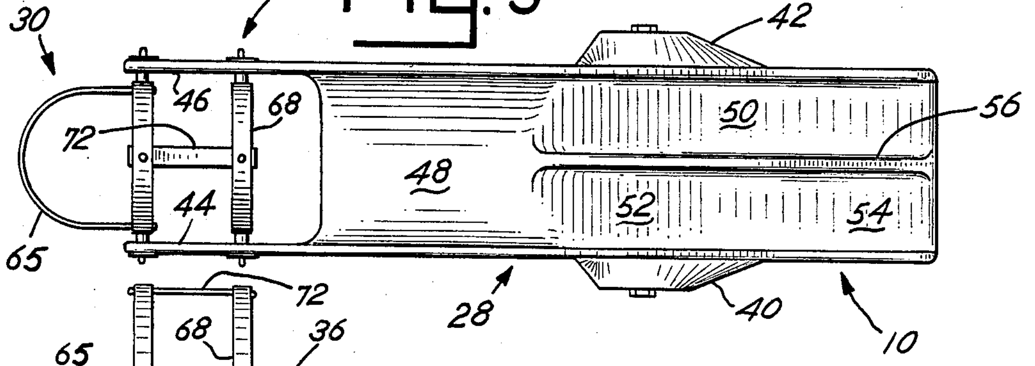
FIG. 3 is a top view of the cart assembly of FIG. 1.
Figure 4:
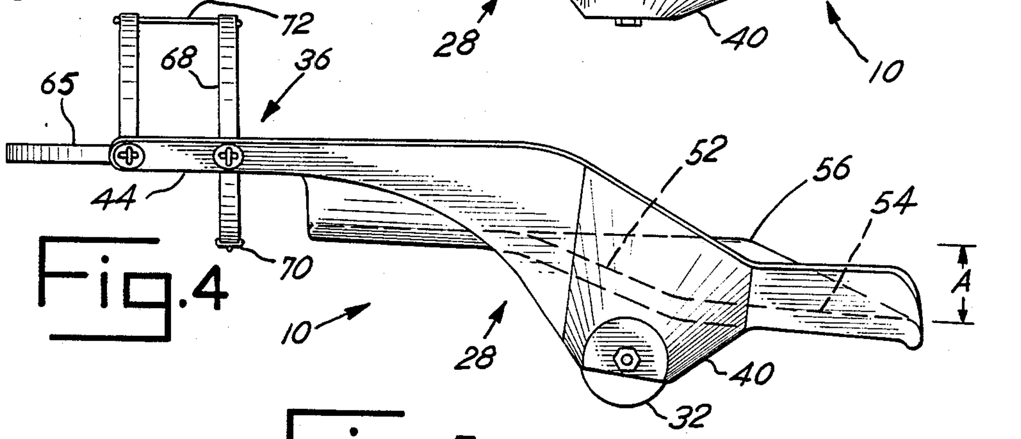
FIG. 4 is a side view of the cart assembly of FIG. 1.
Figure 5:
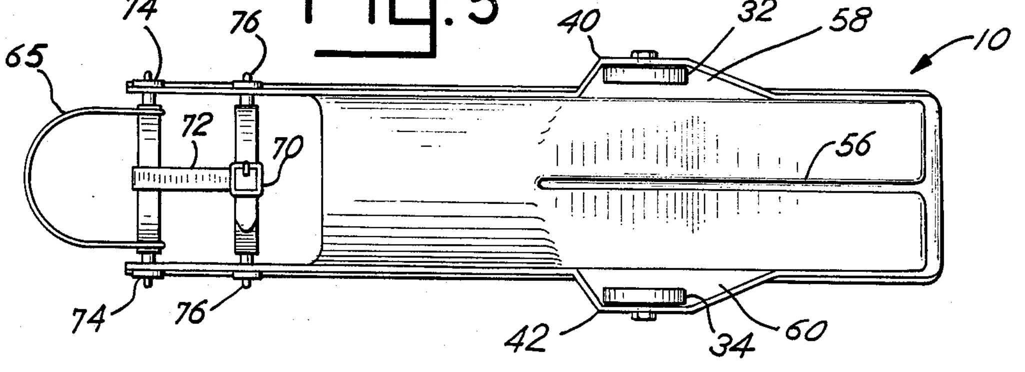
FIG. 5 is a bottom view of the cart assembly of FIG. 1.

The harness arms 44, 46 are adapted to extend along the front body portion 20 of the animal 12 terminating in the shoulder region 16. As best shown in FIG. 2, each of the harness arms 44, 46 defines a pair of fastener slots 62, 64, respectively, near the terminus end.

The harness 30 includes a conventional leash harness 65 secured about the head 14 and front body portion 20 of the animal 12, and extending into the shoulder region 16. The leash harness 65 includes a neck band 66 and adjustable body band 68 having a buckle or snap mechanism 70. A strap 72 interconnects the neck band 66 and body band 68 to ensure proper positioning of the harness 30 on the animal 12.

The neck and body bands 66, 68 each include a pair of opposed, rotatable locking tabs 74, 76, respectively, which cooperatively define the fastener means 36. The tabs 74, 76 substantially align with the slots 62, 64 of the harness arms 44, 46, such that the plastic cradle 28 may be secured to the harness 30.

The wheels 32, 34 are rotatably secured to the skirt portions 40, 42 within the wheel wells 58, 60 respectively. The wheels 32, 34 are preferably separately mounted, i.e., do not share a common axle.

In this preferred embodiment, the cart assembly 10 also includes a stabilizing strap 78 adapted to further secure the animal 12 upon the plastic cradle 28. The stabilizing strap 78 extends across the channeled hind-support section 50 so as to engage the animal 12 in the hip region 22.

The plastic cradle 28 provides firm and balanced support for the animal 12. Comfort is enhanced in that the animal 12 is in a familiar "resting" position. This in turn reduces the time necessary for the animal 12 to adjust and become familiar with the cart assembly 10 as well as the time and effort required to position and secure the animal 12 upon the cart assembly 10. The contour and wheel arrangement of the plastic cradle 28 also substantially avoids interference between the cart assembly 10 and ground clutter.

A preferred embodiment of the present invention has been described herein. It is to be understood, however, that certain modifications and changes can be made without departing from the true scope and spirit of the present invention, which are defined by the following claims.

What is claimed is:

1. A cart assembly for a partially-immobilized animal, said animal having a head, front portion, shoulder region, front legs, middle portion, hind portion, and hind legs, comprising, in combination:

an integrally formed cradle, said cradle including an animal support portion adapted to receive and support in an extended and prone position said middle portion, hind portion and hind legs of said partially-immobilized animal, a support member extending forwardly from each of two opposing sides of said animal support portion and terminating at opposing sides of said shoulder region of said partially-immobilized animal, and a flange portion extending downwardly from each of said two opposing sides of said animal support portion of said integrally formed cradle wherein said animal support portion of said integrally formed cradle includes a contoured mid-support section and a channeled hind-support section for providing support for said middle portion, hind portion, and hind legs of said partially immobilized animal, said channeled hind-section including a first part extending downwardly from said mid-support section and a second part substantially parallel to said mid-support section;

a harness to be worn by said partially-immobilized animal, said harness being secured about said head, extending along said front portion, and terminating in said shoulder region;

fastener means for securing said harness to said support members; and a wheel rotably secured to an inner side of each of said flange portions.

2. A cart assembly as claimed in claim 1 wherein said wheel is shielded by an outer side of each of said flange portions of said integrally formed cradle.

3. A cart assembly as claimed in claim 1 wherein said integrally formed cradle is plastic.

* * * * *